(12) United States Patent
Nakajima

(10) Patent No.: US 8,489,389 B2
(45) Date of Patent: Jul. 16, 2013

(54) ELECTRONIC APPARATUS WITH DICTIONARY FUNCTION AND COMPUTER-READABLE MEDIUM

(75) Inventor: Daisuke Nakajima, Fussa (JP)

(73) Assignee: Casio Computer Co., Ltd, Tokyo (JP)

( * ) Notice: Subject to any disclaimer, the term of this patent is extended or adjusted under 35 U.S.C. 154(b) by 378 days.

(21) Appl. No.: 12/892,015

(22) Filed: Sep. 28, 2010

(65) Prior Publication Data

US 2011/0077937 A1 Mar. 31, 2011

(30) Foreign Application Priority Data

Sep. 30, 2009 (JP) ................................. 2009-228601

(51) Int. Cl.
*G06F 18/27* (2006.01)
(52) U.S. Cl.
USPC ...................................... 704/9; 704/1; 704/10
(58) Field of Classification Search
USPC .............................................. 704/1, 2, 9, 10
See application file for complete search history.

(56) References Cited

U.S. PATENT DOCUMENTS

| | | | | | |
|---|---|---|---|---|---|
| 4,590,560 | A | * | 5/1986 | Sado | 704/10 |
| 4,811,273 | A | * | 3/1989 | Kishimoto | 704/2 |
| 5,224,041 | A | * | 6/1993 | Fushimoto | 704/2 |
| 5,473,705 | A | * | 12/1995 | Abe et al. | 382/100 |
| 7,194,404 | B1 | * | 3/2007 | Babst et al. | 704/9 |
| 2005/0216251 | A1 | * | 9/2005 | Dorius | 704/2 |
| 2007/0172799 | A1 | * | 7/2007 | Aubert | 434/157 |

FOREIGN PATENT DOCUMENTS

| | | |
|---|---|---|
| JP | 01-307865 | 12/1989 |
| JP | 02-044459 | 2/1990 |
| JP | 03-108062 | 5/1991 |
| JP | 05-081313 | 4/1993 |
| JP | 05-135006 | 6/1993 |
| JP | 06-044214 | 2/1994 |
| JP | 07-168827 | 7/1995 |
| JP | 2008071017 | 3/2008 |

OTHER PUBLICATIONS

Japanese Office Action for Japanese Patent Application No. 2009-228601 mailed on Aug. 23, 2011.

* cited by examiner

*Primary Examiner* — Douglas Godbold
(74) *Attorney, Agent, or Firm* — Turocy & Watson, LLP

(57) ABSTRACT

An electronic apparatus includes a storage which includes dictionary information, a conjugation chart database which stores conjugation charts for a language stored in the dictionary information so as to cause the charts to correspond to conjugation chart numbers, and a verb-verb conjugation chart correspondence table which stores the conjugation chart numbers so as to cause the numbers to correspond to the spellings of verbs, and a processor which causes to display letter strings stored in the dictionary information, accepts the specification of an arbitrary word from the letter strings displayed, when the specified word is a verb, refers to the verb-verb conjugation chart correspondence table and determines a conjugation chart number caused to correspond to the spelling of the specified verb, and reads a conjugation chart corresponding to the determined conjugation chart number from the conjugation charts stored in the conjugation chart database and displays the conjugation chart.

5 Claims, 9 Drawing Sheets

FIG.3A
VERB-VERB CONJUGATION CHART CORRESPONDENCE TABLE

EXCEPTION VERB TABLE 22c1

| VERB | CONJUGATION CHART NUMBER |
|---|---|
| partir | 33 |
| departir | 33 |
| repartir | 33 |
| sortir | 33 |
| ressortir | 33 |
| offrir | 19 |
| souffrir | 19 |
| : | : |

FIG.3B

SIX-LETTER ENDING VERB TABLE 22c2

| VERB | CONJUGATION CHART NUMBER |
|---|---|
| -aillir | 20 |
| -eillir | 21 |
| -uillir | 19 |
| : | : |

FIG.3C

FIVE-LETTER ENDING VERB TABLE 22c3

| VERB | CONJUGATION CHART NUMBER |
|---|---|
| -orrnir | 34 |
| -ourir | 22 |
| -ervir | 35 |
| : | : |

FIG.3D

FOUR-LETTER ENDING VERB TABLE 22c4

| VERB | CONJUGATION CHART NUMBER |
|---|---|
| -é + CONSONANT + er | 12 |
| -vrir | 19 |
| : | : |

FIG.3E

THREE-LETTER ENDING VERB TABLE 22c5

| VERB | CONJUGATION CHART NUMBER |
|---|---|
| -rir | 22 |
| : | : |

FIG.3F

TWO-LETTER ENDING VERB TABLE 22c6

| VERB | CONJUGATION CHART NUMBER |
|---|---|
| -er | er |
| -ir | ir |
| -re | re |
| : | : |

FIG.4

CONJUGATION CHART DATABASE 22d

| CONJUGATION CHART NUMBER | CONJUGATION CHART DATA |
|---|---|
| er | ▦ INFINITIVE/PRESENT PARTICIPLE/PAST PARTICIPLE<br>-er -ant -é<br>· INDICATIVE PRESENT<br>je -e<br>tu -es<br>... |
| ir | ... |
| re | ... |
| 1 | ... |
| 2 | ... |
| ... | ... |
| 86 | ... |

ELECTRONIC APPARATUS WITH DICTIONARY FUNCTION AND COMPUTER-READABLE MEDIUM

CROSS-REFERENCE TO RELATED APPLICATIONS

This application is based upon and claims the benefit of priority from prior Japanese Patent Application No. 2009-228601, filed Sep. 30, 2009, the entire contents of which are incorporated herein by reference.

BACKGROUND OF THE INVENTION

1. Field of the Invention

This invention relates to an electronic apparatus with a dictionary function and a computer-readable medium including a control program for the apparatus.

2. Description of the Related Art

In recent years, an electronic dictionary apparatus with various foreign-language dictionaries has become popular.

The basic requirements for language learners (especially middle-level learners) to make progress in foreign languages lie in learning grammar, vocabulary, and pronunciation.

When a person memorizes words as part of vocabulary learning, he or she must memorize not only the words but also various inflections, conjugations, and declensions. French, German, Italian, Spanish, and the like conjugate more highly than English.

For example, in the case of a French verb, its spelling changes according to person, number, mood, tense, voice, and the like.

Accordingly, in a language whose verb conjugate highly, it is particularly important to learn how a desired verb conjugates.

Printed dictionaries and some electronic dictionary apparatuses have conjugation charts where conjugations have been organized in tabular form. Referring to the conjugations of the desired verb in the charts can be said to be an effective learning technique.

However, to refer to the conjugation charts with such dictionaries, the user had to visually confirm the conjugations of a verb and search for the appropriate conjugational chart, which was troublesome.

To overcome this drawback, an electronic dictionary apparatus capable of displaying a list of conjugations of a specified verb has been considered.

With a conventional electronic dictionary apparatus, conjugation database which caused the base form of a word to correspond to each of the conjugations for each of the verbs included in a dictionary database was stored, thereby enabling a list of the conjugations of a specified verb to be displayed.

Consequently, in the conventional electronic dictionary apparatus, the burden of developing a conjugation database was great and a large data capacity was needed. In addition, conjugation charts could not be displayed.

BRIEF SUMMARY OF THE INVENTION

An object of the invention is to provide an electronic apparatus with a dictionary function capable of displaying conjugation charts for a desired verb efficiently and a computer-readable medium including a control program for the apparatus.

According to a first aspect of the invention, there is provided an electronic apparatus comprising: an input device; a display device; a storage which includes dictionary information which stores entry words and explanatory information on the entry words in such a manner that the former and the latter correspond to one another, a conjugation chart database which stores conjugation charts for a language stored in the dictionary information so as to cause the charts to correspond to conjugation chart numbers, and a verb-verb conjugation chart correspondence table which stores the conjugation chart numbers so as to cause the numbers to correspond to the spellings of verbs; and a processor which causes the display device to display letter strings stored in the dictionary information, accepts the specification of an arbitrary word from the letter strings displayed on the display device via the input device, when the specified word is a verb, refers to the verb-verb conjugation chart correspondence table and determines a conjugation chart number caused to correspond to the spelling of the specified verb, and reads a conjugation chart corresponding to the determined conjugation chart number from the conjugation charts stored in the conjugation chart database and displays the conjugation chart.

According to a second aspect of the invention, there is provided an electronic apparatus with a dictionary function comprising: dictionary information storage means for storing entry words and explanatory information on the entry words in such a manner that the former and the latter correspond to one another; conjugation chart storage means for storing conjugation charts for a language stored by the dictionary information storage means so as to cause the charts to correspond to conjugation chart numbers; verb-verb conjugation chart correspondence table storage means for storing tables which cause the conjugation chart numbers to correspond to the spellings of verbs; letter string display means for displaying letter strings stored by the dictionary information storage means; word specifying means for specifying an arbitrary word according to user operation from the letter strings displayed by the letter string display means; conjugation chart number determination means for, when a word specified by the word specifying means is a verb, referring to the tables stored by the verb-verb conjugation chart correspondence table and determines a conjugation chart number caused to correspond to the spelling of the specified verb; and conjugation chart display means for reading a conjugation chart corresponding to the conjugation chart number determined by the conjugation chart number determination means from the conjugation charts stored by the conjugation chart storage means and displaying the conjugation chart.

According to a third aspect of the invention, there is provided a computer-readable medium which stores a software program that is executed by a computer system including an input device, a display device, and a storage and that includes a series of instructions to cause the computer system to carry out processes, the processes comprising: causing the storage to store dictionary information that causes entry words and explanatory information on the entry words to correspond to one another; causing the storage to store a conjugation chart database that causes conjugation charts to correspond to conjugation chart numbers; causing the storage to store a verb-verb conjugation chart correspondence table that causes the conjugation chart numbers to correspond to the spellings of verbs; causing the display device to display letter strings stored in the storage; accepting the specification of an arbitrary word from the letter strings displayed on the display device via the input device; when the specified word is a verb, referring to the verb-verb conjugation chart correspondence table and determining a conjugation chart number caused to correspond to the spelling of the specified verb; and reading a conjugation chart corresponding to the determined conjugation chart number from the conjugation charts in the conjugation chart database and displaying the conjugation chart.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIGS. 3A, 3B, 3C, 3D, 3E, and 3F are French verb-verb conjugation chart correspondence tables 22c stored in a main storage unit 22 of the electronic dictionary apparatus 10;

FIG. 4 shows a French conjugation chart database 22d stored in the main storage unit 22 of the electronic dictionary apparatus 10;

DETAILED DESCRIPTION OF THE INVENTION

Hereinafter, referring to the accompanying drawings, embodiments of the invention will be explained.

Figure 1:
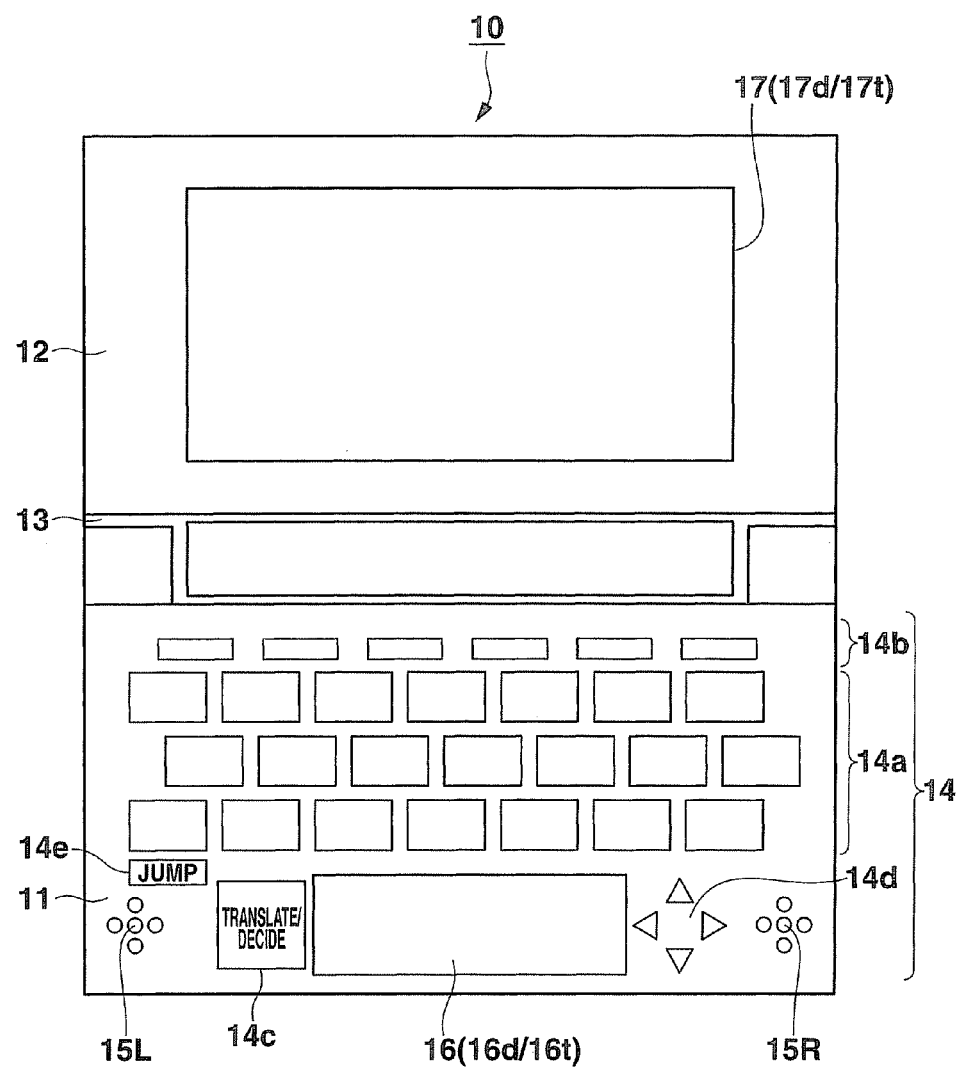
FIG. 1 is a front view showing an outer configuration of an electronic dictionary apparatus 10 according to an embodiment of an electronic apparatus with a dictionary function of the invention.

FIG. 1 is a front view showing an outer configuration of an electronic dictionary apparatus 10 according to an embodiment of an electronic apparatus with a dictionary function of the invention.

The electronic apparatus with the dictionary function is configured to function as a portable device dedicated for an electronic dictionary (electronic dictionary apparatus 10) explained below, a personal digital assistant (PDA) with a dictionary function, a personal computer (PC), a mobile phone, an electronic book reader, a handheld video game machine, or the like.

The electronic dictionary apparatus 10 is configured to have a foldable case which enables a body case 11 and a cover case 12 to be opened and closed via a hinge part 13. At the surface of the body case 11 with the foldable case opened, there are provided a key input unit (keyboard) 14 and a handwriting input unit (subscreen) 16. The key input unit 14 includes letter input keys 14a, dictionary specify keys 14b, "Translate/Decide" key 14c, cursor keys 14d, "JUMP" key 14e, and speakers 15L, 15R.

The handwriting input unit (subscreen) 16 has a structure into which a touch position detection device and a display device are integrated. The touch position detection device detects the position touched by the user with a pen, his or her finger, or the like. The handwriting input unit (subscreen) 16 is configured to have, for example, a transparent touch panel 16t laid on a 256-×64-dot liquid-crystal screen 16d on the center front side of the key input unit 14. The input area of the handwriting input unit 16 is switched between a handwriting character (kanji) input area for inputting handwritten characters, a button input area for various functions, and a mixed area of various input areas as needed.

A track resulting from handwriting input with the handwriting input unit 16 switched to the handwriting character input area echoes back to the liquid-crystal screen, which displays the track.

At the surface of the cover case 12, there is provided, for example, a 480-×320-dot touch panel display unit (main screen) with backlighting 17 so as to cover almost the entire surface. Like the handwriting input unit (subscreen) 16, the touch panel display unit (main screen) 17 also has a structure into which a touch position detection device and a display device are integrated. The touch position detection device detects the position touched by the user with a pen, his or her finger, or the like. The touch panel display unit 17 is configured to have a transparent touch panel 17t laid on the liquid-crystal screen 17d.

Figure 2:
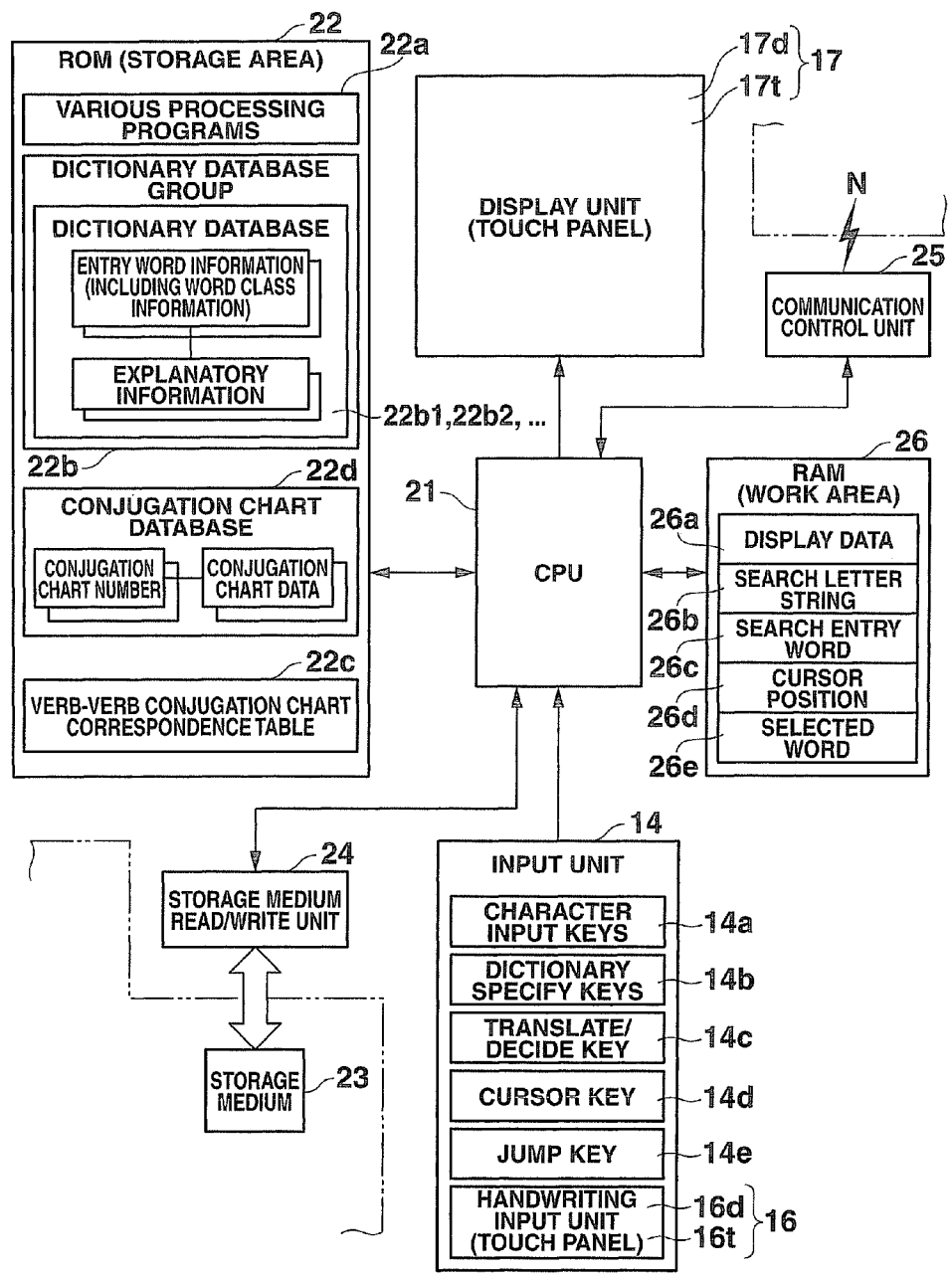
FIG. 2 is a block diagram showing a configuration of the electronic circuit of the electronic dictionary apparatus 10.

FIG. 2 is a block diagram showing a configuration of the electronic circuit of the electronic dictionary apparatus 10.

The electronic dictionary apparatus 10 is composed of a computer which reads programs recorded in various storage media or transmitted programs and whose operation is controlled by the read programs. The electronic circuit of the computer is provided with a central processing unit (CPU) 21.

According to an apparatus control program stored in the main storage unit (flash ROM) 22, the CPU 21 controls the operation of each part of the circuit using a RAM 26 as a working memory. The apparatus control program includes, for example, a program previously stored in the main storage unit 22, a program read into the main storage unit 22 from an external storage medium 23, such as a ROM card, via a storage medium read/write unit 24, and a program read into the main storage unit 22 from a Web server (in this case, a program server) on the Internet N via a communication control unit 25.

The apparatus control program stored in the main storage unit 22 is activated in response to an input signal corresponding to user operation of the key input unit 14, handwriting input unit 16, or touch panel display unit 17, a communication signal exchanged with each Web server on the Internet N connected via the communication control unit 25, or a connection communication signal with a memory card (storage medium) 23, such as an EEPROM, a RAM, or a ROM, externally connected via the storage medium read/write unit 24.

Connected to the CPU 21 are the main storage unit 22, storage medium read/write unit 24, communication control unit 25, RAM 26, key input unit 14, handwriting input unit 16, touch panel display unit 17, and the like.

The apparatus control program stored in the main storage unit 22 includes a system program that supervises the overall operation of the electronic dictionary apparatus 10 and a communication program that is for performing data communication with each Web server on the Internet N via the communication control unit 25 or with a user personal computer (PC) (not shown).

Various processing programs 22a for controlling all of the search processes on the basis of a dictionary database 22b, a verb-verb conjugation chart correspondence table 22c, and a conjugation database 22d are stored in the main storage unit 22. The search processes include an entry word search process of searching for an entry word according to the input of a search letter string, the process of reading and displaying various pieces of explanatory information, including a translation, a description, an example sentence (usage example) corresponding to a retrieved entry word, a jump search process of searching an arbitrarily selected dictionary for explanatory information on an arbitrarily specified word in the displayed dictionary information, and a conjugation chart display process of reading and displaying a conjugation chart for a verb arbitrarily specified in the jump search process.

A plurality of dictionary contents 22b1, 22b2, ... have been previously stored in or downloaded into the dictionary database 22b.

For example, an English-Japanese dictionary database 22b1 where Japanese explanatory information (including English example sentences and the like) is written so as to correspond to English entry words and a French-English dictionary database 22b2 where English explanatory information (including French example sentences and the like) is written so as to correspond to French entry words have been stored in the dictionary database 22b.

FIGS. 3A to 3F show the French verb-verb conjugation chart correspondence table 22c stored in the main storage unit 22 of the electronic dictionary apparatus 10.

The verb-verb conjugation chart correspondence table 22c stores table data which causes the number of the conjugation chart (conjugation chart number) to correspond to the spelling of the ending of a verb by the number of letters in the ending of a French verb.

Specifically, the following tables are stored in the main storage unit 22: a six-letter ending verb table 22c2 (FIG. 3B) which lists conjugation chart numbers corresponding to the six-letter endings of various spellings, a five-letter ending verb table 22c3 (FIG. 3C) which lists conjugation chart numbers corresponding to the five-letter endings of various spellings, a four-letter ending verb table 22c4 (FIG. 3D) which lists conjugation chart numbers corresponding to the four-letter endings of various spellings, a three-letter ending verb table 22c5 (FIG. 3E) which lists conjugation chart numbers corresponding to the three-letter endings of various spellings, and a two-letter ending verb table 22c6 (FIG. 3F) which lists conjugation chart numbers corresponding to the two-letter endings of various spellings.

In addition to this, an exception verb table 22c1 (FIG. 3A) which lists conjugation chart numbers corresponding to various verbs which cannot be standardized in the spelling of the ending of a word is also stored in the main storage unit 22.

FIG. 4 shows a French conjugation chart database 22d stored in the main storage unit 22 of the electronic dictionary apparatus 10.

The conjugation chart database 22d stores data items in the conjugation charts caused to correspond to the conjugation chart numbers in a one-to-one correspondence.

Specifically, conjugation chart data on a verb whose two-letter ending is "~er" is stored so as to correspond to conjugation chart number "er." Conjugation chart data on a verb whose two-letter ending is "~ir" is stored so as to correspond to conjugation chart number "ir." Conjugation chart data on a verb whose two-letter ending is "~re" is stored so as to correspond to conjugation chart number "re."

Together with these, 86 types of conjugation chart data items corresponding to verbs with various endings differing in conjugation are stored so as to correspond to conjugation chart numbers "1" to "86."

For example, in conjugation chart data with conjugation chart number "er," the conjugations of verbs whose two-letter endings are "~er," "~ant," and "~e'" are written as [je (first person singular) -e] [tu (second person singular) -es] [il (third person singular) -e] [nous (first person plural) -ons] [vous (second person plural) -ez] [ils (third person plural) -ent].

RAM 26 includes a display data memory 26a, a search letter string memory 26b, a search entry word memory 26c, a cursor position memory 26d, a selected word memory 26e, and a working memory in which various data items input and output to and from the CPU 21 according to the various processing programs 22a.

The display data memory 26a includes a display data storage area corresponding to the display screen of the touch panel display unit 17. Data to be displayed on the display screen is expanded as bitmap pattern data, which is then stored.

The search letter string memory 26b stores a letter string (search letter string) key-input as a search target of an entry word of a dictionary database 22bn specified with the dictionary specify keys 14b.

The search entry word memory 26c stores an entry word (search entry word) retrieved from the specified dictionary database 22bn on the basis of the search letter string.

The cursor position memory 26d stores the position of the cursor Cu on the screen displayed on the touch panel display unit 17.

The selected word memory 26e stores a word specified and selected with the cursor Cu from the displayed dictionary information.

Next, a conjugation chart display function of the electronic dictionary apparatus 10 configured as described above will be explained.

Figure 5:
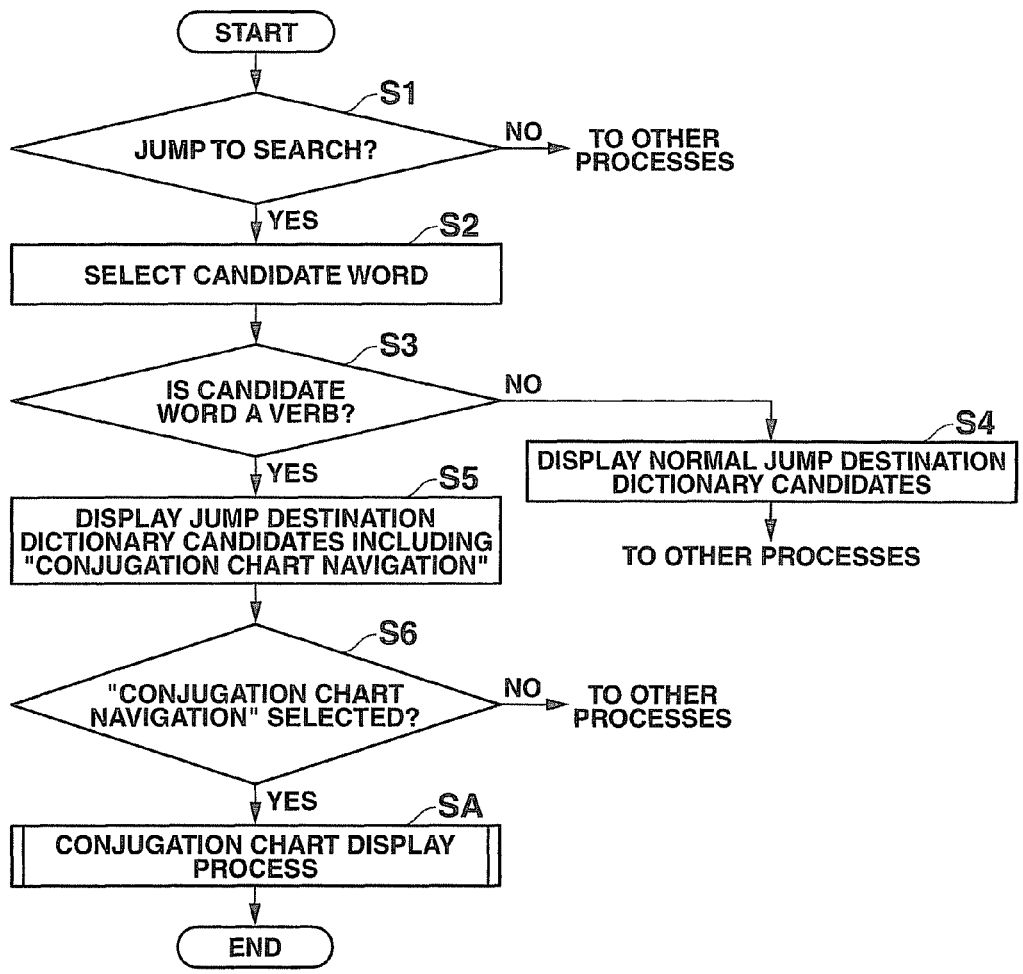
FIG. 5 is a flowchart to explain the process of transiting to a conjugation chart display process in a jump search mode as a result of a dictionary search process in the electronic dictionary apparatus 10.

FIG. 5 is a flowchart to explain the process of transiting to a conjugation chart display process in a jump search mode in a dictionary search process in the electronic dictionary apparatus 10.

Figure 6:
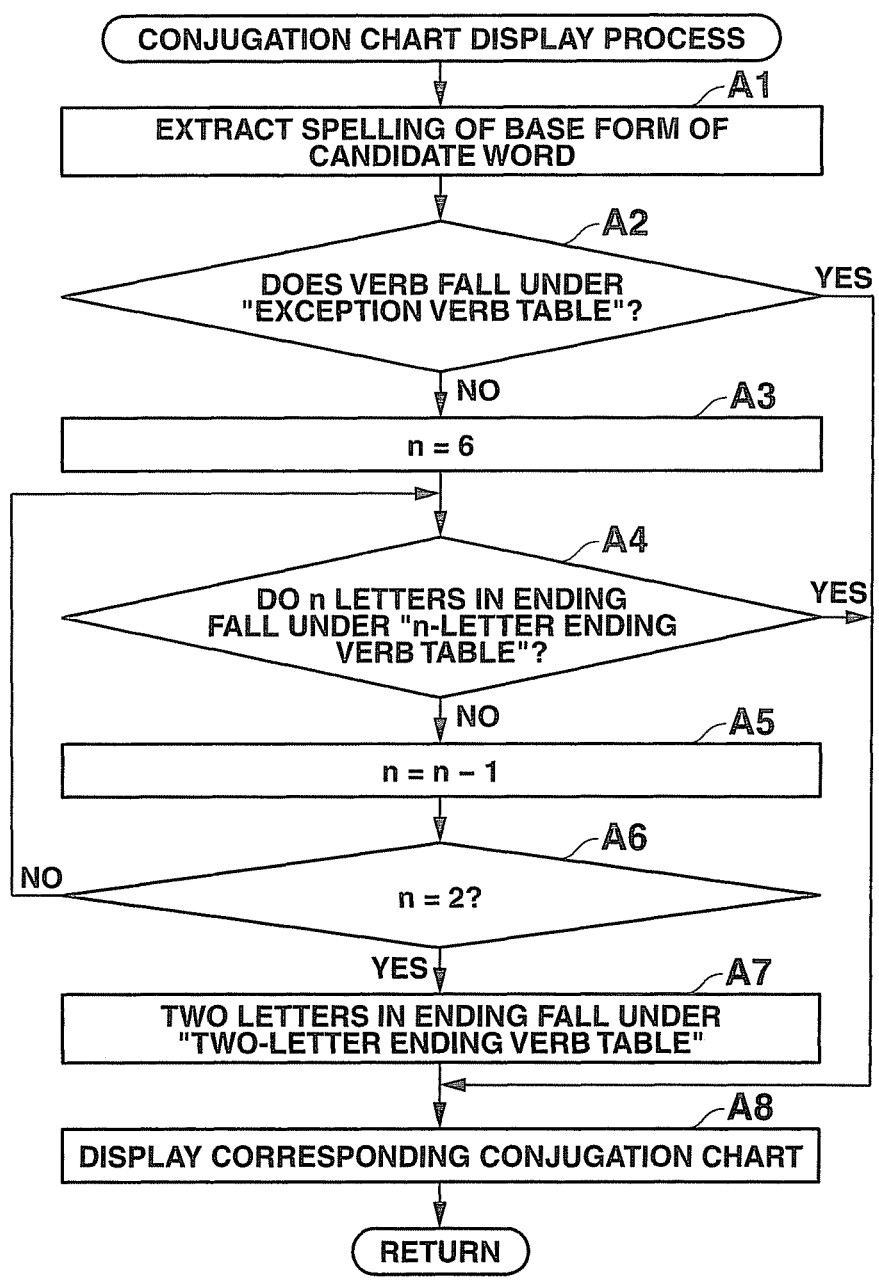
FIG. 6 is a flowchart to explain the conjugation chart display process in the jump search mode of the electronic dictionary apparatus 10.

FIG. 6 is a flowchart to explain the conjugation chart display process in the jump search mode of the electronic dictionary apparatus 10.

(First Embodiment)

Figure 7A:
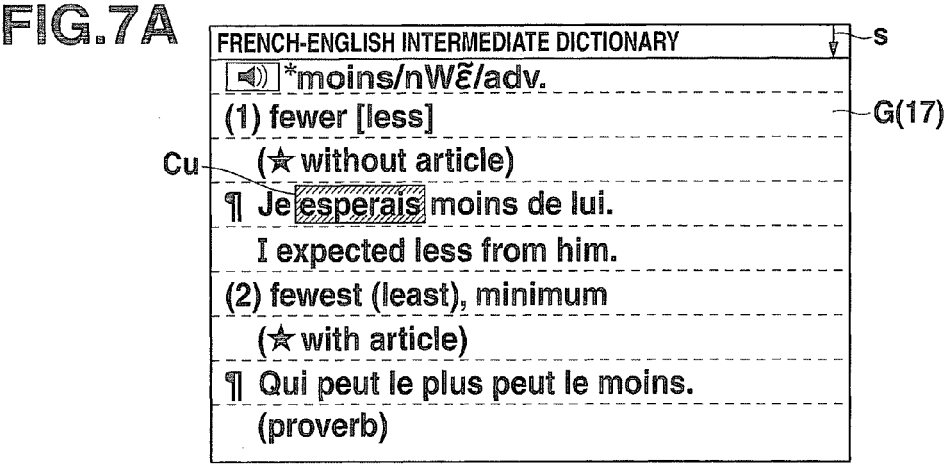
FIGS. 7A, 7B, and 7C show display operations (a first embodiment of the invention) in the conjugation chart display process in the jump search mode of the electronic dictionary apparatus 10.
Figure 7B:
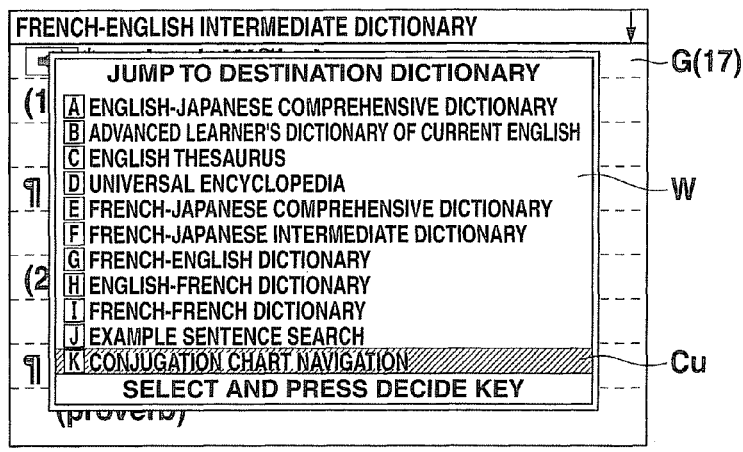
Figure 7C:
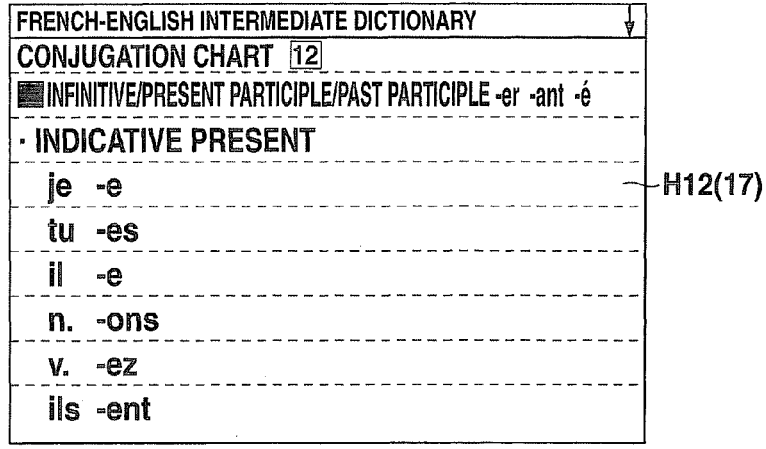

FIGS. 7A, 7B, and 7C show display operations (a first embodiment of the invention) in the conjugation chart display process in the jump search mode of the electronic dictionary apparatus 10.

When the dictionary specify key 14b is pressed, a desired search letter string "mo . . . " is key-input on a search letter string input screen (not shown) on which, for example, French-English dictionary database 22b2 has been specified and is stored in the search letter string memory 26b. When "Translate/Decide" key 14c is pressed, an entry word which forward-coincides with the search letter string "mo . . . " is retrieved from the French-English dictionary database 22b2 and stored in the search entry word memory 26c. Then, a search entry word list screen (not shown) is displayed on the touch panel display unit 17.

When a desired entry word "moins" is selected on the entry word list screen, explanatory information corresponding to the selected entry word "moins" is read from the French-English dictionary database 22b2 and displayed as an explanatory information display screen G on the touch panel display unit 17 as shown in FIG. 7A.

On the explanatory information display screen G, when explanatory information can still be displayed by scrolling the screen upward or downward from the presently displayed explanatory information, a scrollable mark S ("↓" or "↑") is displayed at the top right of the screen G.

In this way, with explanatory information on the desired entry word "moins" being displayed on the explanatory information display screen G, when "JUMP" key 14e is pressed to jump search for an arbitrary word included in the explanatory information, the operation mode of the CPU 21 is set to the jump search mode (YES in step S1).

Here, when the cursor keys 14d are operated to move cursor Cu as shown in FIG. 7A and select a desired word "espe' rais" and "Translate/Decide" key 14c is pressed (step S2), word class information is read from explanatory information on base entry word "espe' rer" in dictionary database 22b2 corresponding to the selected word "espe' rais" and it is determined whether the selected word is a verb (step S3).

If it has been determined that the selected word is not a verb (No in step S3), a jump destination dictionary list window which lists candidates for a normal jump destination dictionary to jump search for the word is displayed (step S4).

In contrast, if it has been determined that the selected word "espe' rais" is a verb (Yes in step S3), a jump destination dictionary list window W which includes the item "Conjugation chart navigation" for displaying conjugation charts as candidates for a jump destination dictionary as shown in FIG. 7B (step S5).

On the jump destination dictionary list window W including the item "Conjugation chart navigation," when the item "Conjugation chart navigation" is selected as a result of the movement of cursor Cu according to user operation of the cursor keys 14d and "Translate/Decide" key 14c is pressed (Yes in step S6), control proceeds to a conjugation chart display process shown in FIG. 6 (step SA).

When the conjugation chart display process is activated, the spelling of base entry word "espe' rer" in dictionary database 22b2 corresponding to the selected word "espe' rais" is extracted (step A1) and it is determined whether a verb which coincides with the base form "espe' rer" of the selected word exists in the exception verb table 22c1 (FIG. 3A) in the verb-verb conjugation chart correspondence table 22c (step A2).

If it has been determined that a verb which coincides with the base form "espe' rer" of the selected word does not exist in the exception verb table 22c1 in the verb-verb conjugation chart correspondence table 22c (No in step A2), an initial value of 6 is set in a counter n for specifying the number of letters in the ending (step A3).

Then, it is determined whether a verb whose ending coincides with the six-letter ending "~spe' rer" of the base form "espe' rer" of the selected word exists in the six-letter ending verb table 22c2 (FIG. 3B) in the verb-verb conjugation chart correspondence table 22c specified by the count of the counter n (=6) (step A4).

If it has been determined that a verb whose ending coincides with the six-letter ending "~spe' rer" of the base form "espe' rer" of the selected word does not exist in the six-letter ending verb table 22c2 (No in step A4), the count of the counter n is decremented [n=n−1] and set to n=5 (step A5).

If the count of the counter n is not 2 (No in step A6), it is determined whether a verb whose ending coincides with the five-letter ending "~pe' rer" of the base form "espe' rer" of the selected word exists in the five-letter ending verb table 22c3 (FIG. 3C) in the verb-verb conjugation chart correspondence table 22c specified by the present count of the counter n (=5) (step A4).

In this case, too, since it has been determined that a verb whose ending coincides with the five-letter ending "~pe' rer" of the base form "espe' rer" of the selected word does not exist in the five-letter ending verb table 22c3 (No in step A4), the count of the counter n is further decremented [n=n−1] and set to n=4 (step A5).

If it has been determined that the count of the counter n is not 2 (No in step A6), it is determined whether a verb whose ending coincides with the four-letter ending "~e' rer" of the base form "espe' rer" of the selected word exists in the four-letter ending verb table 22c4 (FIG. 3D) in the verb-verb conjugation chart correspondence table 22c specified by the present count of the counter n (=4) (step A4).

If it has been determined that a verb whose ending coincides with the four-letter ending "~e' rer" of the base form "espe' rer" of the selected word exists in the four-letter ending verb table 22c4 (Yes in step A4), conjugation chart number "12" caused to correspond to a verb with the same ending "~' + consonant + er" is read.

Then, conjugation chart data caused to correspond to conjugation chart number "12" stored in the conjugation chart database 22d (FIG. 4) is read according to the read conjugation chart number "12" and is displayed as conjugation chart H12 as shown in FIG. 7C (step A8).

Accordingly, conjugation chart H12 for the desired verb "espe' rais" found from the explanatory information display screen G can be displayed easily and efficiently.

(Second Embodiment)

Figure 8A:
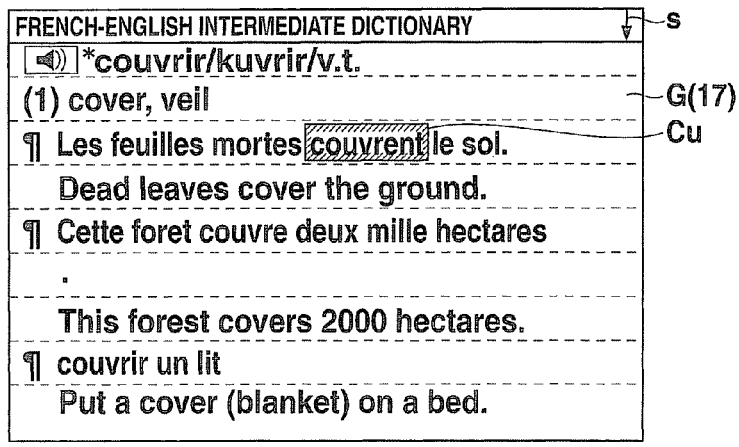
FIGS. 8A, 8B, and 8C show display operations (a second embodiment of the invention) in the conjugation chart display process in the jump search mode of the electronic dictionary apparatus 10.
Figure 8B:
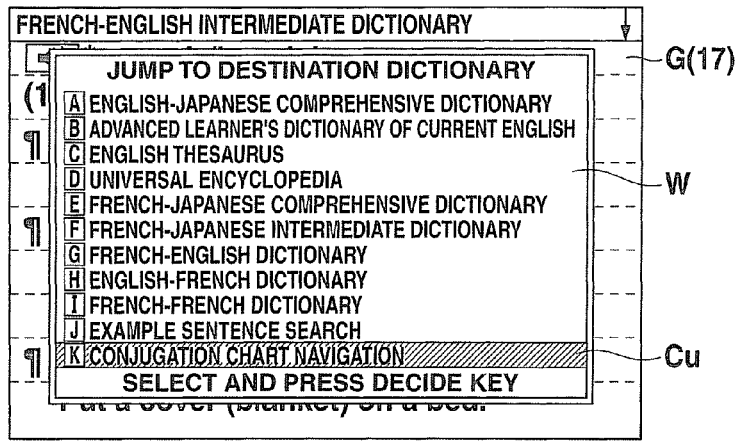
Figure 8C:
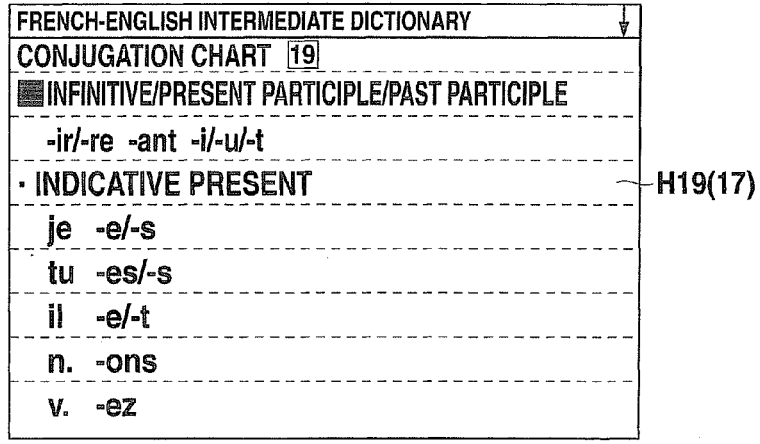

FIGS. 8A to 8C show display operations in the conjugation chart display process in the jump search mode of the electronic dictionary apparatus 10 according to a second embodiment of the invention. As shown in FIG. 8A, with the explanatory information display screen G corresponding to a desired entry word "couvrir" retrieved from French-English dictionary database 22b2 being displayed, when "JUMP" key 14e is pressed, the operation mode of CPU 21 is set in the jump search mode (Yes in step S1).

If the desired word "couvrent" is selected with cursor Cu and "Translate/Decide" key 14c is pressed (step S2), word class information is read from explanatory information on the base entry word "couvrir" in dictionary database 22b2 corresponding to the selected word "couvrent" and it is determined that the word is a verb (Yes in step S3).

Then, as shown in FIG. 8B, the jump destination dictionary list window W including the item "Conjugation chart navigation" is displayed (step S5).

In the jump destination dictionary list window W, if the item "Conjugation chart navigation" is selected with cursor Cu and "Translate/Decide" key 14c is pressed (Yes in step S6), control is passed to the conjugation chart display process in FIG. 6 (step SA).

Then, first, the spelling of the base entry word "couvrir" in dictionary database 22b2 corresponding to the selected word "couvrent" is extracted (step A1) and it is determined whether a verb which coincides with the base form "couvrir" of the selected word exists in the exception verb table 22c1 (FIG. 3A) in the verb-verb conjugation chart correspondence table 22c (step A2).

If it has been determined that a verb which coincides with the base form "couvrir" of the selected word does not exist in the exception verb table 22c1 in the verb-verb conjugation chart correspondence table 22c (No in step A2), an initial value of 6 is set in a counter n for specifying the number of letters in the ending of a word (step A3).

Then, it is determined whether a verb whose ending coincides with the six-letter ending "~ouvrir" of the base form "couvrir" of the selected word exists in the six-letter ending verb table 22c2 (FIG. 3B) in the verb-verb conjugation chart correspondence table 22c specified by the counter n (=6) (step A4).

If it has been determined that a verb whose ending coincides with the six-letter ending "~ouvrir" of the base form "couvrir" of the selected word does not exist in the six-letter ending verb table 22c2 (No in step A4), the count of the counter n is decremented [n=n−1] and set to n=5 (step A5).

If it has been determined that the count of the counter n is not 2 (No in step A6), it is determined whether a verb whose ending coincides with the five-letter ending "~uvrir" of the base form "couvrir" of the selected word exists in the five-letter ending verb table 22c3 (FIG. 3C) in the verb-verb conjugation chart correspondence table 22c specified by the present count of the counter n (=5) (step A4).

In this case, too, since it has been determined that a verb whose ending coincides with the five-letter ending "~uvrir" of the base form "couvrir" of the selected word does not exist in the five-letter ending verb table 22c3 (No in step A4), the count of the counter n is further decremented [n=n−1] and set to n=4 (step A5).

If it has been determined that a verb whose ending coincides with the four-letter ending "~vrir" of the base form "couvrir" of the selected word exists in the four-letter ending verb table 22c4 (FIG. 3D) in the verb-verb conjugation chart correspondence table 22c specified by the present count of the counter n (=4) (Yes in step A4), conjugation chart number "19" caused to correspond to a verb with the same ending "~vrir" is read.

Then, conjugation chart data caused to correspond to conjugation chart number "19" stored in the conjugation chart database 22d (FIG. 4) is read according to the read conjugation chart number "19" and is displayed as conjugation chart H19 as shown in FIG. 8C (step A8).

Accordingly, conjugation chart H19 for the desired verb "couvrent" found from the explanatory information display screen G can be displayed easily and efficiently.

(Third Embodiment)

Figure 9A:
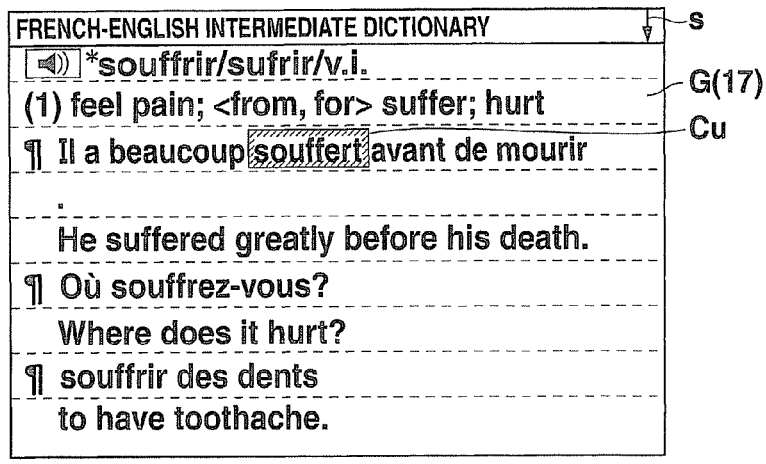
FIGS. 9A, 9B, and 9C show display operations (a third embodiment of the invention) in the conjugation chart display process in the jump search mode of the electronic dictionary apparatus 10.
Figure 9B:
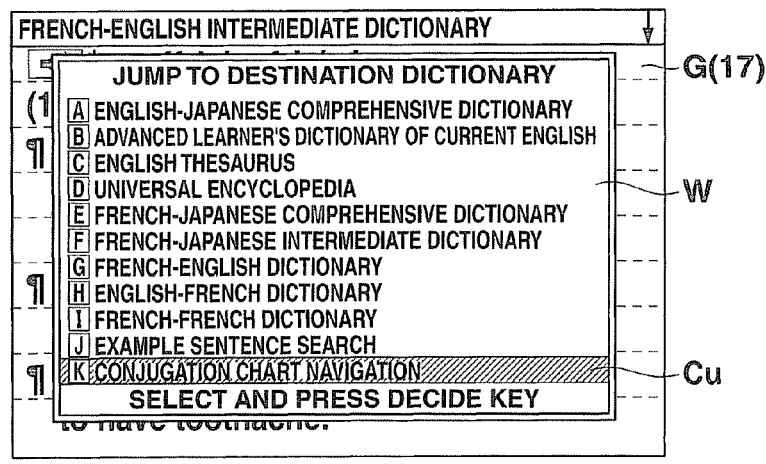
Figure 9C:
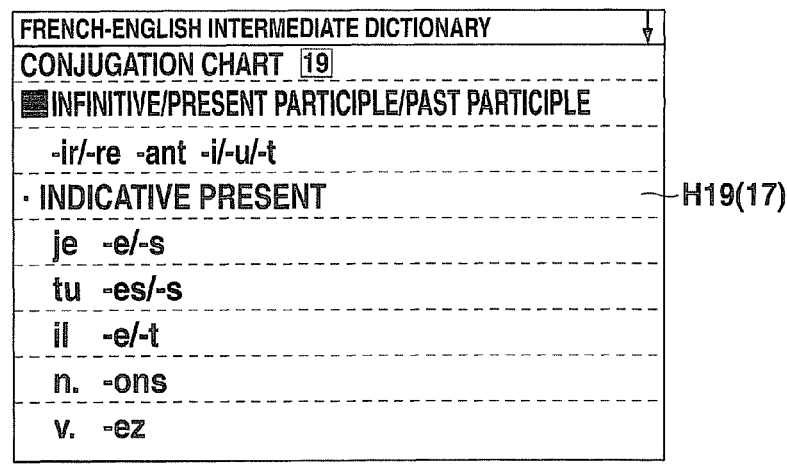

FIGS. 9A to 9C show display operations in the conjugation chart display process in the jump search mode of the electronic dictionary apparatus 10 according to a third embodiment of the invention.

As shown in FIG. 9A, with the explanatory information display screen G corresponding to a desired entry word "souffrir" retrieved from French-English dictionary database 22b2 being displayed, when "JUMP" key 14e is pressed, the operation mode of CPU 21 is set in the jump search mode (Yes in step S1).

If a desired word "souffert" is selected with cursor Cu and "Translate/Decide" key 14c is pressed (step S2), word class information is read from explanatory information on the base entry word "souffrir" in dictionary database 22b2 corresponding to the selected word "souffert" and it is determined that the word is a verb (Yes in step S3).

Then, as shown in FIG. 9B, the jump destination dictionary list window W including the item "Conjugation chart navigation" is displayed (step S5).

In the jump destination dictionary list window W, if the item "Conjugation chart navigation" is selected with cursor Cu and "Translate/Decide" key 14c is pressed (Yes in step S6), control is passed to the conjugation chart display process in FIG. 6 (step SA).

Then, first, the spelling of the base entry word "souffrir" in dictionary database 22b2 corresponding to the selected word "souffert" is extracted (step A1) and it is determined whether a verb which coincides with the base form "souffrir" of the selected word exists in the exception verb table 22c1 (FIG. 3A) in the verb-verb conjugation chart correspondence table 22c (step A2).

In the third embodiment, since it has been determined that a verb which coincides with the base form "souffrir" of the selected word exists in the exception verb table 22c1 in the verb-verb conjugation chart correspondence table 22c (Yes in step A2), conjugation chart number "19" caused to correspond to the exception verb "souffrir" is read.

Then, conjugation chart data caused to correspond to conjugation chart number "19" stored in the conjugation chart database 22d (FIG. 4) is read according to the read conjugation chart number "19" and is displayed as conjugation chart H19 as shown in FIG. 9C (step A8).

Accordingly, conjugation chart H19 for the desired verb "souffert" found from the explanatory information display screen G can be displayed easily and efficiently.

(Fourth Embodiment)

Figure 10A:
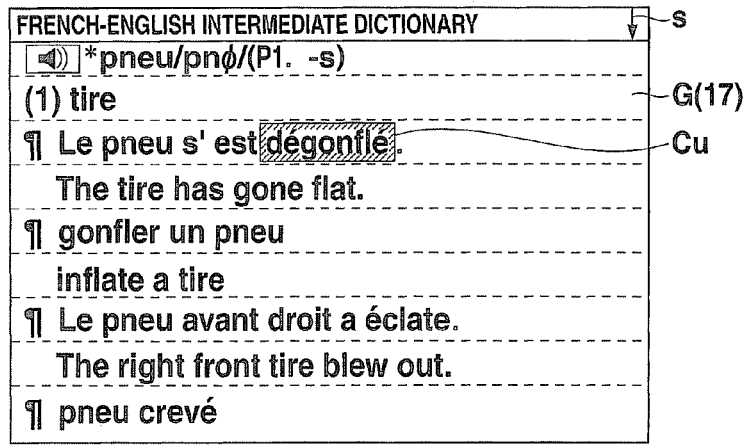
FIGS. 10A, 10B, and 10C show display operations (a fourth embodiment of the invention) in the conjugation chart display process in the jump search mode of the electronic dictionary apparatus 10.
Figure 10B:
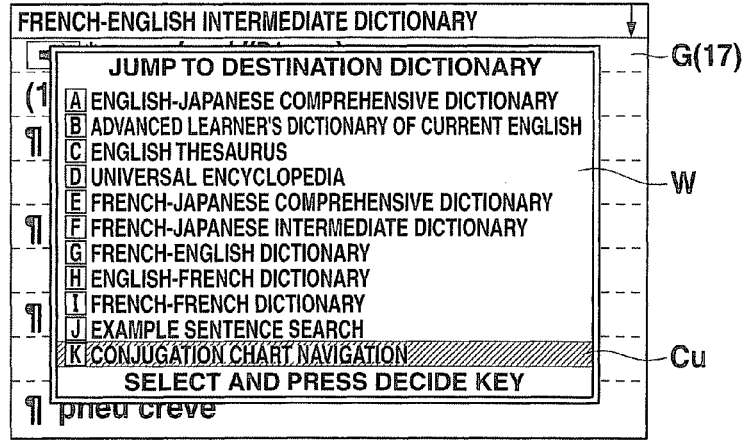
Figure 10C:
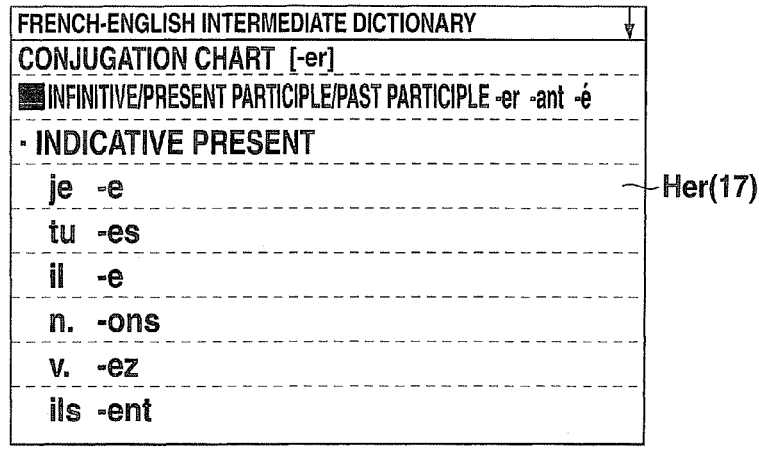

FIGS. 10A to 10C show display operations in the conjugation chart display process in the jump search mode of the electronic dictionary apparatus 10 according to a fourth embodiment of the invention.

As shown in FIG. 10A, with the explanatory information display screen G corresponding to a desired entry word "pneu" retrieved from French-English dictionary database 22b2 being displayed, when "JUMP" key 14e is pressed, the operation mode of CPU 21 is set in the jump search mode (Yes in step S1).

If a desired word "de' gonfle'" is selected with cursor Cu and "Translate/Decide" key 14c is pressed (step S2), word class information is read from explanatory information on the base entry word "de' gonfler" in dictionary database 22b2 corresponding to the selected word "de' gonfle'" and it is determined that the word is a verb (Yes in step S3).

Then, as shown in FIG. 10B, the jump destination dictionary list window W including the item "Conjugation chart navigation" is displayed (step S5).

In the jump destination dictionary list window W, if the item "Conjugation chart navigation" is selected with cursor Cu and "Translate/Decide" key 14c is pressed (Yes in step S6), control is passed to the conjugation chart display process in FIG. 6 (step SA).

Then, first, the spelling of the base entry word "de' gonfler" in dictionary database 22b2 corresponding to the selected word "de' gonfile'" is extracted (step A1) and it is determined whether a verb which coincides with the base form "de' gonfler" of the selected word exists in the exception verb table 22c1 (FIG. 3A) in the verb-verb conjugation chart correspondence table 22c (step A2).

In the fourth embodiment, it has been determined that a verb which coincides with the base form "de' gonfler" of the selected word does not exist in the exception verb table 22c1 in the verb-verb conjugation chart correspondence table 22c (No in step A2) and an initial value of 6 is set in a counter n for specifying the number of letters in the ending of a word (step A3).

Then, it has been determined that a verb whose ending coincides with an n number of letters in the ending of the base form "de' gonfler" of the selected word exists in none of the following tables: six-letter ending verb table 22c2 (FIG. 3B) in verb-verb conjugation chart correspondence table 22c specified by counter n (=6), five-letter ending verb table 22c3 (FIG. 3C) specified by counter n (=5), four-letter ending verb table 22c4 (FIG. 3D) specified by counter n (=4), and three-letter ending verb table 22c5 (FIG. 3E) specified by counter n (=3) (No in step A4).

Then, the count of the counter n is further decremented [n=n−1] (step A5) and it is determined that the count of the counter n is 2 (Yes in step A6). It is then determined that a verb whose ending coincides with the two-letter ending "~er" of the base form "de' gonfler" of the selected word exists in a two-letter ending verb table 22c6 (FIG. 3F) specified by counter n (=2) (step A7).

Then, conjugation chart number "er" caused to correspond to a verb with the two-letter ending "~er" of the base form "de' gonfler" of the selected word is read from the two-letter ending verb table 22c6.

Then, conjugation chart data caused to correspond to conjugation chart number "er" stored in the conjugation chart database 22d (FIG. 4) is read according to the read conjugation chart number "er" and is displayed as conjugation chart Her as shown in FIG. 10C (step A8).

Accordingly, conjugation chart Her for the desired verb "de' gonfle'" found from the explanatory information display screen G can be displayed easily and efficiently.

The conjugation chart display function of the electronic dictionary apparatus 10 configured as described above includes conjugation chart database 22d caused to correspond to the verb (conjugation chart) numbers and verb-verb conjugation chart correspondence tables (six-letter ending) 22c2 to (two-letter ending) 22c6 which cause the spellings of the n-letter endings to correspond to the verb (conjugation chart) numbers for each of the number of letters n (=6 to 2) in the ending of a verb. With dictionary information, such as explanatory information display screen G, being displayed, when the jump search mode is set and a desired word is selected, if the selected word is a verb, jump destination dictionary list window W including the item "Conjugation chart navigation" for displaying a conjugation chart is displayed. When the item "Conjugation chart navigation" is selected, verb-verb conjugation chart correspondence tables 22c which coincide with the spellings of the n-letter ending of the base form of the selected word are determined sequentially, beginning with the table with the largest number of letters n. A conjugation chart is read from conjugation chart database 22d according to the corresponding conjugation chart number.

Accordingly, it is not necessary to store an inflection database which causes each inflection to correspond to the base form of a word for each of the verbs included in the dictionary database, enabling a conjugation chart of a desired verb to be displayed efficiently, which enhances convenience and learning performance.

In the first to fourth embodiments, French-English dictionary database 22b2 has been retrieved and the conjugation charts for a French word has been displayed. As for other European languages, including German, Italian, and Spanish, whose verbs conjugate highly, a desired conjugation chart can be displayed efficiently by preparing a conjugation chart database 22d and a verb-verb conjugation chart correspondence table 22c which are similar to those in the first to fourth embodiments.

The methods of the individual processes carried out by the electronic dictionary apparatus 10 in the first to third embodiments, including the process of transiting to the conjugation chart display process in the jump search mode in the dictionary search process shown in the flowchart of FIG. 5, the various methods including the conjugation chart display process in the jump search mode in the flowchart of FIG. 6, dictionary database 22b, verb-verb conjugation chart correspondence table 22c, conjugation chart database 22d, can be stored in an external storage medium 23, such as a memory card (e.g., a ROM card or a RAM card), a magnetic disk (e.g., a floppy disk or a hard disk), an optical disk (e.g., a CD-ROM or a DVD), or a semiconductor memory, in the form of programs the computer can execute. Then, the media can be delivered. The computer loads the program stored in the external storage medium 23 into the storage unit (22). The computer is then controlled by the read-in program, thereby realizing the conjugation chart displaying function explained in the embodiments, which enables the same processes in the aforementioned methods to be carried out.

Furthermore, the data of the programs which realize the above methods can be transferred in the form of program code through a communication network N. The program data can be loaded into a computer connected to the network N via the communication control unit 25, thereby realizing the conjugation chart displaying function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   an input device;
   a display device;
   a storage which includes dictionary information which stores entry words and explanatory information on the entry words in such a manner that the former and the latter correspond to one another,
   a conjugation chart database which stores conjugation charts for a language stored in the dictionary information so as to cause the charts to correspond to conjugation chart numbers,
   an ending-based verb storing unit which stores the conjugation chart number so as to cause the number to correspond to the spelling of a verb with an n-letter ending by the number of letters n in the ending of the verb, and
   an exception verb storing unit which stores the conjugation chart number so as to cause the number to correspond to the spelling of a verb; and
   a processor which
      causes the display device to display letter strings stored in the dictionary information,
      accepts the specification of an arbitrary word from the letter strings displayed on the display device via the input device,
      when the specified word is a verb, refers to the exception verb storing unit and determines whether the exception verb storing unit stores a spelling coinciding with the specified verb,
      when it has been determined that the exception verb storing unit stores no spelling coinciding with the specified verb, sequentially refers to the ending-based verb storing units and determines whether the ending-based verb storing units store a spelling coinciding with the n-letter ending of the specified verb, reads one of the conjugation charts from the conjugation chart database, based on the conjugation chart number corresponding to the spelling which has been determined to coincide with the specified verb or the n-letter ending of the specified verb by the determination, and displays the conjugation chart.

2. The electronic apparatus according to claim 1, wherein the processor, when the specified word is a verb, displays a selection screen which causes a user to select referring to another dictionary or causing the conjugation chart to be displayed for the word, and when causing the conjugation chart to be displayed is selected on the displayed selection screen according to a user operation, executes an operation of determining presence of the spelling by referring to the exception verb storing unit and the ending-based verb storing unit.

3. An electronic apparatus with a dictionary function comprising:

dictionary information storage means for storing entry words and explanatory information on the entry words in such a manner that the former and the latter correspond to one another;

conjugation chart storage means for storing conjugation charts for a language stored by the dictionary information storage means so as to cause the charts to correspond to conjugation chart numbers;

ending-based verb storing means for storing the conjugation chart number so as to cause the number to correspond to the spelling of a verb with an n-letter ending by the number of letters n in the ending of the verb;

exception verb storing means for storing the conjugation chart number so as to cause the number to correspond with the spelling of a verb;

letter string display means for displaying letter strings stored by the dictionary information storage means;

word specifying means for specifying an arbitrary word according to user operation from the letter strings displayed by the letter string display means;

first determination means for, when a word specified by the word specifying means is a verb, referring to the exception verb storing means and determining whether the exception verb storing means stores a spelling coinciding with the specified verb;

second determination means for, when the first determination means has determined that the exception verb storing means stores no spelling coinciding with the specified verb, sequentially referring to the ending-based verb storing means, and determining whether the ending-based verb storing means store a spelling coinciding with the n-letter ending of the specified verb; and conjugation chart display means for reading one of the conjugation charts from the conjunction chart storing means, based on the conjunction chart number corresponding to the spelling which has been determined to coincide with the specified verb or the n-letter ending of the specified verb by the first determination means or the second determination means, and displaying the conjugation chart.

4. The electronic apparatus with the dictionary function according to claim 3, wherein the conjugation chart number determination means includes reference target candidate display means for, when a word specified by the word specifying means is a verb, displaying a selection screen which causes a user to select referring to another dictionary or causing the conjugation chart to be displayed for the word, and when causing the conjugation chart to be displayed is selected on the displayed selection screen according to a user operation, presence of the spelling of the specified verb is determined by the first determination means and the second determination means.

5. A non-transitory computer-readable medium which stores a software program that is executed by a computer system including an input device, a display device, and a storage and that includes a series of instructions to cause the computer system to carry out processes, the processes comprising:

causing the storage to store dictionary information that causes entry words and explanatory information on the entry words to correspond to one another;

causing the storage to store a conjugation chart database that causes conjugation charts to correspond to conjugation chart numbers;

causing the storage to store and ending-based verb storing unit which stores the conjugation chart number so as to cause the number to correspond to the spelling of a verb with an n-letter ending by the number of letters n in the ending of a verb;

causing the storage to store an exception verb storing unit which stores the conjugation chart number so as to cause the number to correspond to the spelling of a verb;

causing the display device to display letter strings stored in the storage;

accepting the specification of an arbitrary word from the letter strings displayed on the display device via the input device;

when the specified word is a verb, referring to the exception verb storing unit and determining whether the exception verb storing unit stores a spelling coinciding with the specified verb;

when it has been determined that the exception verb storing unit stores no spelling coinciding with the specified verb, sequentially referring to the ending-based verb storing units and determining whether the ending-based verb storing units store a spelling coinciding with the n-letter ending of the specified verb;

reading one of the conjugation charts from the conjugation chart database, based on the conjugation chart number corresponding to the spelling which has been determined to coincide with the specified verb or the n-letter ending of he specified verb by the determination, and displaying the conjugation chart.

* * * * *